United States Patent [19]

Heath et al.

[11] Patent Number: 5,323,133

[45] Date of Patent: Jun. 21, 1994

[54] METHOD AND APPARATUS FOR MAKING ELECTRICAL CONNECTION WITH A MOVABLE MEMBER

[75] Inventors: Michael C. Heath, Cary; John J. Quinn, Raleigh, both of N.C.

[73] Assignee: Lord Corporation, Erie, Pa.

[21] Appl. No.: 914,248

[22] Filed: Jul. 15, 1992

[51] Int. Cl.⁵ .............................................. H01F 7/08
[52] U.S. Cl. .................................. 335/222; 335/231
[58] Field of Search ............................... 335/222, 231

[56] References Cited

U.S. PATENT DOCUMENTS

| | | | |
|---|---|---|---|
| Re. 23,125 | 6/1949 | Koch | 335/222 |
| 1,726,394 | 8/1929 | Heusser | 335/231 |
| 2,111,643 | 3/1938 | Salvatori | 335/222 |
| 2,170,571 | 8/1939 | Mott | 335/231 |
| 4,193,654 | 3/1980 | Hughes et al. | |
| 4,227,767 | 10/1980 | Mouissie | |
| 4,441,780 | 4/1984 | Walters | |
| 4,462,657 | 7/1984 | Snowdon et al. | |
| 4,671,591 | 6/1987 | Archer | |
| 4,909,747 | 3/1990 | Daubigny et al. | |

Primary Examiner—Lincoln Donovan
Attorney, Agent, or Firm—Richard K. Thomson; Randall S. Wayland; James W. Wright

[57] ABSTRACT

A device for making electrical connection to a reciprocating element, such as to a voice coil of an actuator. An electrical flow path utilizing the helical centering springs as a primary element in conducting current ensures reliable current flow to a reciprocating element and avoids high-speed flexing of brittle wires. Hardwired connections are utilized only between stationary elements. A second double-coil actuator embodiment employs a coaxial, substantially co-extensive pair of springs as the input and return current flow paths for each actuator.

21 Claims, 6 Drawing Sheets

METHOD AND APPARATUS FOR MAKING ELECTRICAL CONNECTION WITH A MOVABLE MEMBER

BACKGROUND AND SUMMARY OF THE INVENTION

This invention relates to the field of electrical connectors. More particularly, this invention is directed to a method and an apparatus for making electrical connection to an electrical element on a movable member, such as to the coil of an actuator, for example.

In developing the fluid mount described and claimed in copending U.S. patent application Ser. No. 07/776,118 filed Oct. 15, 1991, entitled "Fluid Mount with Active Vibration Control," which is hereby incorporated by reference, one of the most significant problems was in making reliable electrical contact with the reciprocating voice coil on actuator 36. Conventional connections proved unworkable. Such a connection utilized a wire which was required to flex repeatedly at a high velocity and frequency. Any wire that was used to effect connection between a relatively stationary power source and the relatively movable actuator coil would quickly fatigue and break.

In choosing a current path, it was of primary importance in the design to use wire connections only between relatively stationary members and to utilize an alternate connector capable of repeated flexing between relatively moving members. By doing so, the fatigue problems associated with repeated flexing of the connecting wire can be eliminated.

The objective of obtaining a reliable electrical connection to a reciprocating member is accomplished by modifying the electrical flow path to permit helical centering springs to form the connecting element in the moving segment of the system. Wires are then used to connect elements that experience little or no relative movement so no flexing of potentially brittle wires results. The centering springs, which are used to return the piston of an actuator to its neutral position, are contacted on each end by a washer made of conductive (e.g., brass, copper) material.

An electrical connector that is mounted upon a relatively stationary structure is hard-wired to a first washer that experiences no motion relative to that stationary structure. Electrical current is transmitted from an electrical supply, through the connector, via the hard-wired connection to the first washer, then axially through the helical centering spring to the second washer. This second washer is hard-wired to the coil of the actuator. Again, there is no relative motion between the second washer and the coil, since both move together.

In a first single-coil actuator embodiment, the current's returnflow path extends from a third washer hard-wired to the opposite end of the actuator's coil, through a bolt of conductive (e.g., brass) material, through a fourth washer, into a second opposing centering spring, into a fifth washer that is hard-wired back to the connector. As was the case with the first two hard-wired connections, these latter two are between relatively immovable components, the coil and third washer being commonly associated with the movable portion of the actuator and the fifth washer and the actuator both being associated with the relatively stationary support structure.

In a second double-coil actuator embodiment, which has a coil at each end of the actuator, each of the centering-spring means is comprised of first and second coaxial, substantially co-extensive helical springs. A first tabbed washer affords a first hard-wired connection to the power source's electrical connection. The current travels axially through the inner helical spring to a second tabbed washer which is hard-wired to a first end of the actuator's coil, the opposite end of the coil being hard-wired to a fourth tabbed washer which is adjacent to the second washer. The outer helical spring serves as a conductor in the return current flow path to a third tabbed washer which is adjacent the first washer and is hard-wired back to the connector. A first spring retainer maintains the first and third washers in non-conducting, spaced relation and a second spring retainer performs the same function for the second and fourth washers. The coil on the opposite end of the actuator utilizes the outer coil as the current input path so as to be reverse wired so the series input current to both actuators drives them in phase.

Various other features, advantages and characteristics will become apparent after a reading of the following detailed description.

DETAILED DESCRIPTION OF THE PREFERRED EMBODIMENTS

Figure 1:
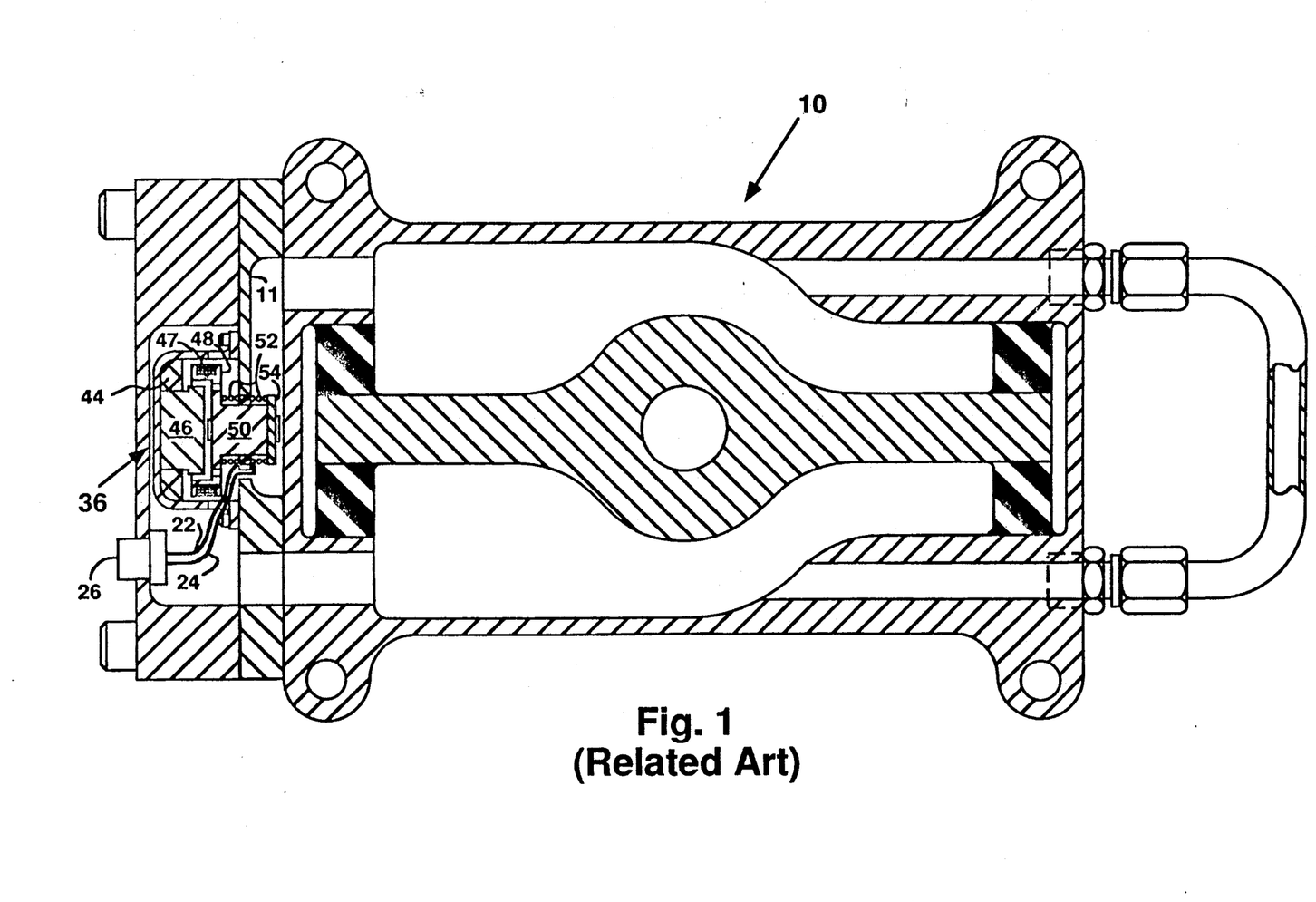
FIG. 1 is labeled Related Art and shows a cross-sectional side view of one possible environmental setting for a first single-coil actuator with which the present invention may be used.

One environment in which the present invention has proven useful is in the fluid mount depicted in FIG. 1 generally at 10. This mount is described in greater particularity in U.S. patent application Ser. No. 07/776,118, cited earlier. It will, of course, be appreciated that this environment is merely exemplary and that the electrical connection method and apparatus of the present invention can be used anywhere there is a need to transmit electrical power to a reciprocating element.

As depicted in FIG. 1, actuator 36 is mounted to input energy into fluid mount 10, to adjust the performance of the mount by effectively softening it dynamically, i.e., moving a fluid notch to a desired frequency. Actuator 36 includes an annular magnet 44 which has a pole piece 46. Voice coil 48 having wire 47 wound about a first end, has a spool or piston 50 at the opposite end that extends through support structure 11 by means of bearing 51. A first helical centering spring 52 encircles spool 50 and reacts against the upper surface of voice coil 48. A second helical centering spring encircles the portion of spool 50 on the opposite side of support structure 11 and reacts against washer 54.

Figure 2:
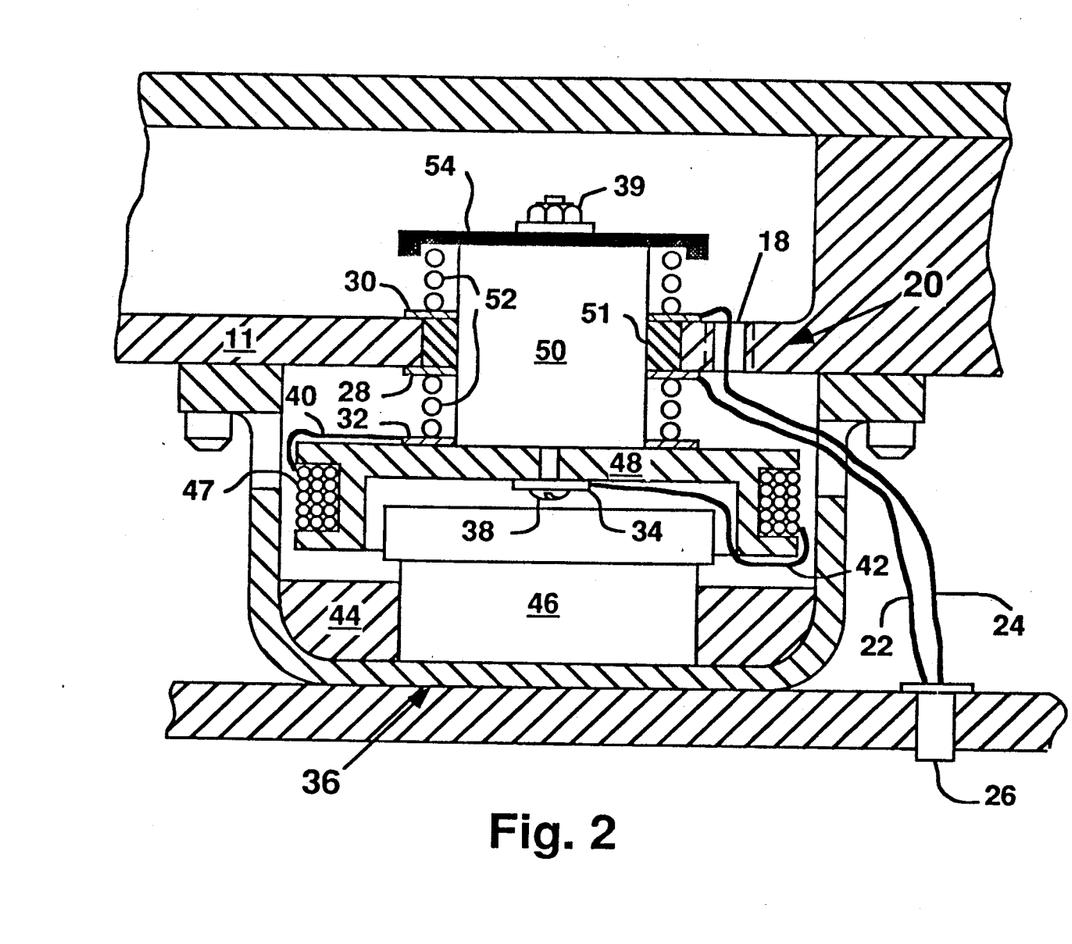
FIG. 2 is an enlarged cross-sectional side view of the single-coil actuator embodiment of FIG. 1.
Figure 3:
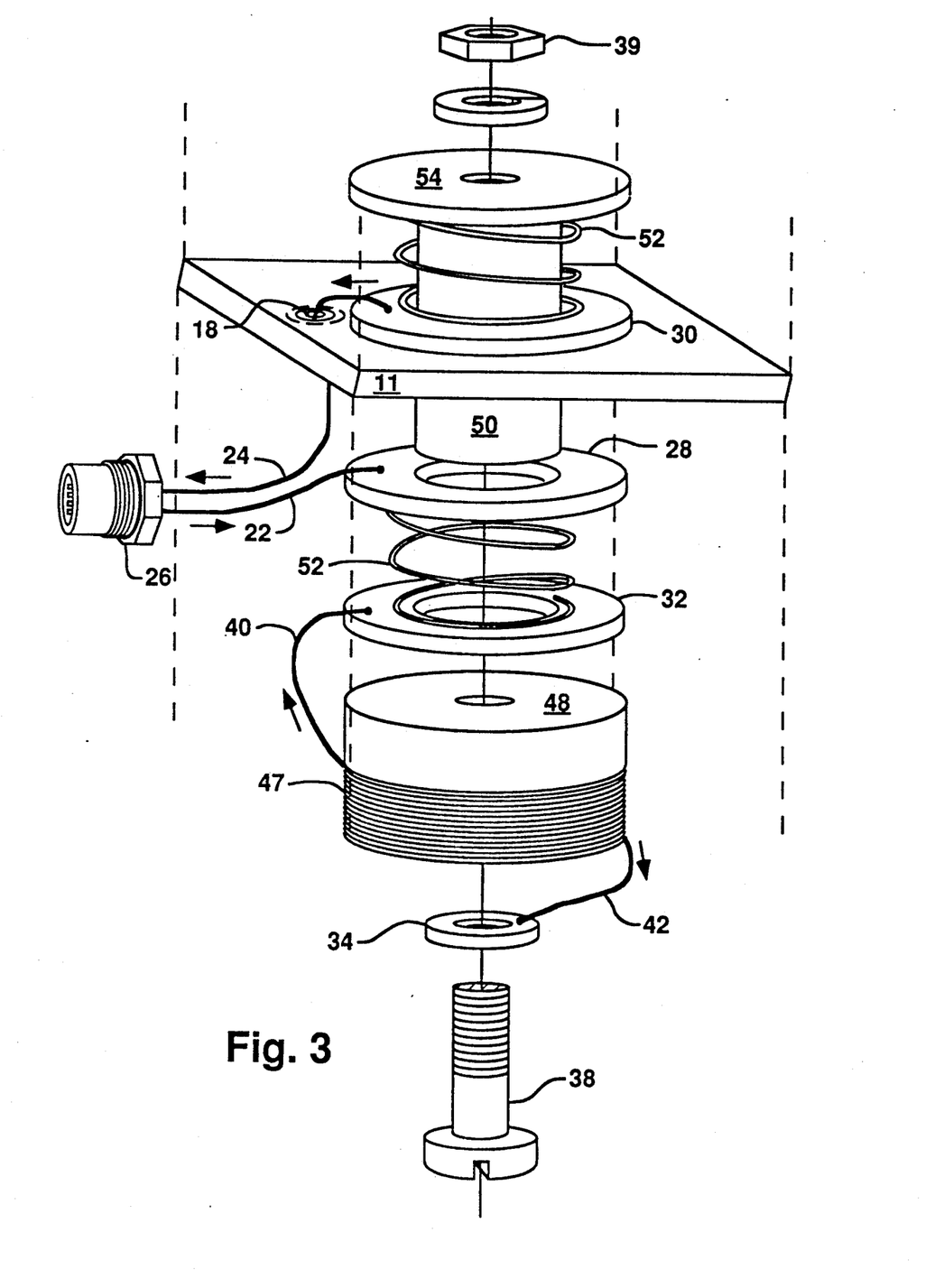
FIG. 3 is an exploded isometric view of the first embodiment of the electrical connection of the present invention.

The details of the electrical connection circuit 20 of a first embodiment of the present invention as used with a single-coil actuator design are shown in greater detail in FIGS. 2 and 3. Electrical input 22 and return 24 wires interconnect electrical connector 26 with washers 28 and 30, respectively, by conventional means, such as soldering. Set screw 18 threads into support structure 11 and has a longitudinal hole which receives return wire 24. Washers 28 and 30 are electrically isolated from structure 11, by an elastomeric coating on the side contacting the surface of structure 11, for example. A washer 32 engages the end of spring 52 opposite electrical input washer 28. A first input end 40 of wire 47 is affixed to washer 32 as by soldering, or other means. The opposite end 42 of wire 47 is hard-wired to washer 34 which is, in turn, engaged beneath the head of bolt 38.

Nut 39 will be tightened upon the end of bolt 38 so as to precompress upper and lower centering springs 52. The level of precompression will be sufficient so the spring 52 that is in an extension mode will never lose contact with the washers (30, 54; 28, 32) sandwiching it, thereby maintaining current flow. Washers 28, 30, 32, 34 and 54, as well as bolt 38 and nut 39, are preferably made of a highly conductive material such as brass or copper and the washers could be part of or fixedly attached to springs 52.

In operation, a power source (not shown) is attached to connector 26. Current flows into actuator 36 through wire 22 to washer 28, through lower spring 52 to washer 32. The lead end 40 of wire 47 inputs the current to voice coil 48 through the output end 42 of wire 47 to washer 34. Current is then conducted on the return flow path by bolt 38 and nut 39 to washer 54 through upper spring 52 to washer 30 and through return wire 24 to the ground terminal of connector 26.

Upper and lower springs 52 will alternatively be compressed storing energy and expand releasing that stored energy to return the piston 50 to a neutral, centered position (absent further actuator input). By controlling the direction and magnitude of the current flowing through voice coil 48, the polarity and magnitude of the induced magnetic field pushing and pulling piston 50 relative to pole piece 46 can be altered, in turn, controlling the energy input to the fluid contained within fluid mount 10. Wires 22, 24, 40, 42 are used to make electrical connection between relatively immovable members and springs 52 make electrical connection between relatively movable members. This eliminates the problems experienced with repeated, high-speed flexing of breakable wire connections.

Figure 4:
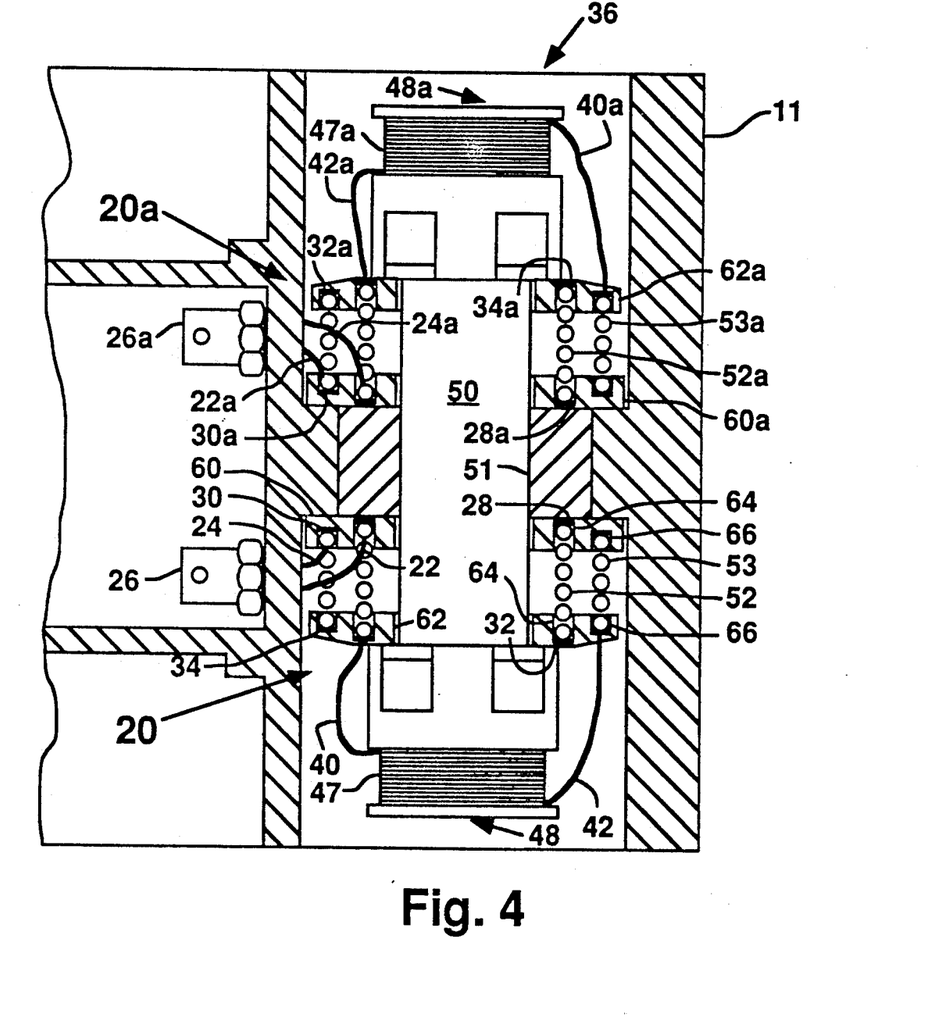
FIG. 4 is a schematic side view of a second embodiment of the electrical connection of the present invention as it might be implemented in a double-coil actuator version, with parts broken away.
Figure 5:
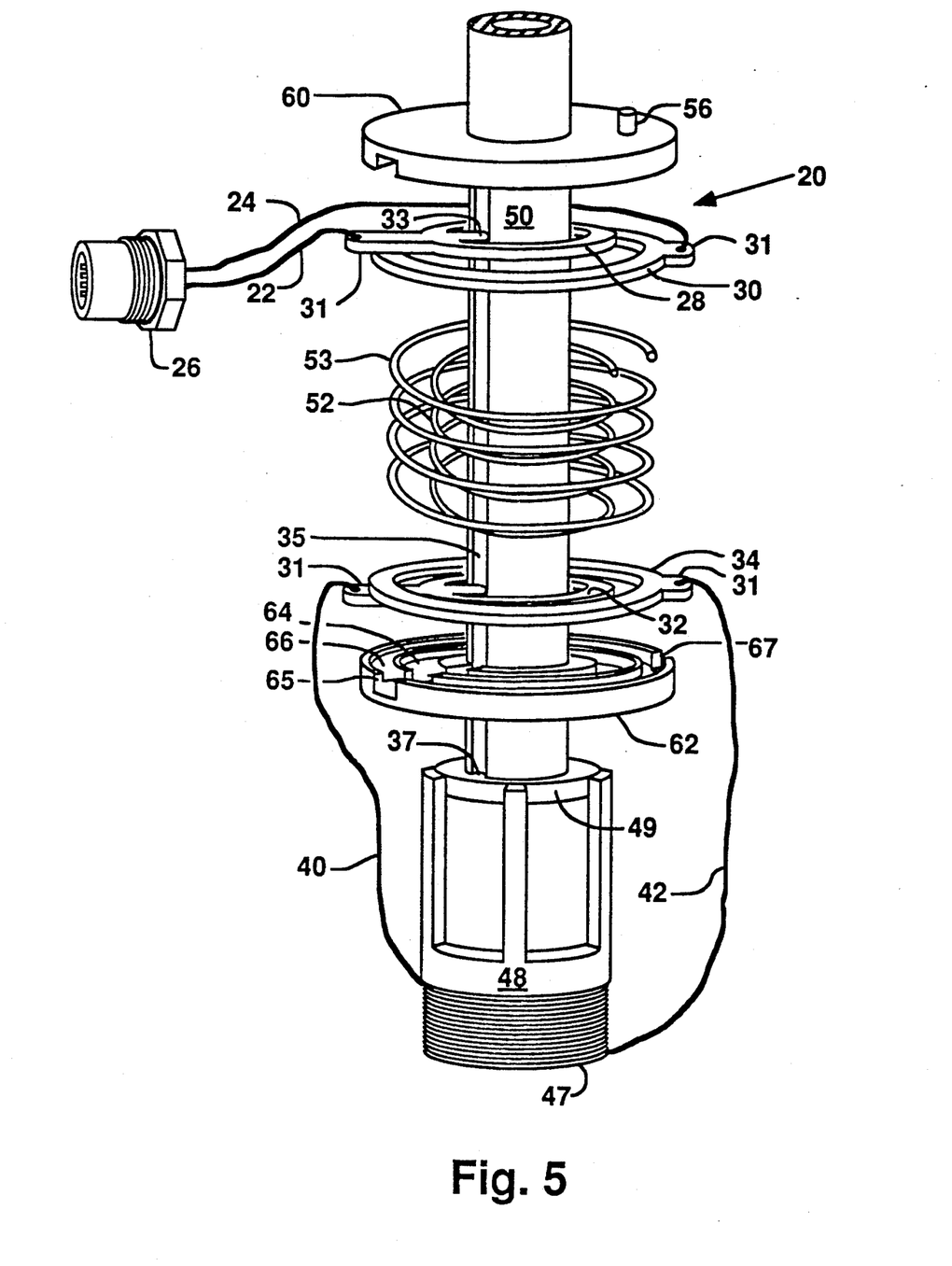
FIG. 5 is an exploded isometric view of one end of the actuator of the embodiment of FIG. 4.

A second embodiment of the present invention is shown in FIGS. 4 and 5. This embodiment employs an actuator 36 with twin voice coils 48, 48a. For some applications, spatial limitations will prevent the winding of sufficient wire 47 on voice coil 48 to generate the force desired. For such applications, a more slender, low-profile actuator design that still provides the desired force capability can be provided by subdividing the coil as shown in this embodiment. The magnet and pole piece present on each end of the double-coil actuator have been omitted from the figures for clarity.

In order to provide power to this double-coil actuator design, duplicate electrical circuits 20, 20a are provided. The current that is input to connectors 26, 26a is in series and, hence, voice coil 48a is wired to provide current flow opposite to that of voice coil 48 so as to provide in-phase force displacement to the actuator 36. The centering springs in the lower electrical circuit 20 comprise an inner helical spring 52 and an outer centering spring 53. As with the previous embodiment pairs of washers 28, 32 and 30, 34 sandwich springs 52 and 53.

Each of the washers 28, 32, 30, and 34 has an outwardly protruding tab 31 to which the electrical input (22, 40) and return (24, 42) wires are attached, as by soldering. At least one of each pair (28, 32 and 30, 34) of washers has an inwardly extending tab 33 which is received in a longitudinal slot 35 in piston 50 to prevent relative rotation between washers 28, 30, 32, 34 and piston 50.

Springs 52 and 53 are coaxial and are substantially co-extensive, with the inner spring being slightly longer. Spring 52 forms the electrical input connector between washers 28 and 32, while spring 53 extends between washers 30 and 34 forming the electrical return connector. Spring retainer 60 receives and restrains first (28) and third (30) washers while lower spring retainer 62 receives and restrains second (32) and fourth (34) washers. Each spring retainer 60, 62 is made of an electrically non-conductive material and includes a first annular channel 64 for receiving the input washer and a second annular channel 66 for receiving the return washer (see FIG. 5). First channel 64 includes a radially extending portion 65 for receiving tabs 31 and 33 on washers 28, 32 and second channel 66 includes a radially extending portion 67 for receiving tab 31 on washers 30, 34. As seen in FIG. 4, first and second channels 64, 66 are at different vertical levels in order to electrically isolate washers associated with the input current from those associated with the return current to avoid short-circuiting the electrical circuit 20.

An anti-rotation pin 56 extends from the upper surface of upper spring retainer 60 and is received in an opening (not shown) in housing 11. Hence, all elements are interlocked to prevent any rotation that could produce breakage of a wire: tabs 31 prevent relative rotation between washers 28, 30, 32, 34 and their respective spring retainers 60 and 62; tabs 33 prevent relative rotation between washers 28, 32 and piston 50; pin 56 prevents relative rotation between the unit formed by elements 28, 30, 32, 34, 48, 50, 60, and 62 and bushing 51 which is fixed in housing 11. Extension 49 used for attaching voice coil 48 to piston 50 also has an anti-rotation tab 37 received in slot 35.

Current flows from a power source (not shown) through connector 26 and input wire 22 to washer 28 by virtue of the connection soldered to tab 31. Current then flows helically through the axial length of spring 52 to washer 32 and then through the lead end 40 of wire 47 wrapped on voice coil 48. The return current flows out the opposite end 42 of wire 47 to washer 34, through spring 53 to washer 30 which is hard-wired to connector 26 by wire 24. As with the first embodiment, all hard-wired connections are made between relatively immovable elements and springs 52 and 53 perform the dual function of returning piston 50 to a neutral, centered position and conducting current to voice coil 48.

As mentioned earlier, the upper circuit 20a is similar to circuit 20. The input current direction through connector 26 can be changed in order to reverse-drive voice coil 48a so that coils 48, 48a are synchronized. Like elements in circuits 20 and 20a bear like reference numerals with the subscript 'a' appearing after the upper circuit's (20a) elements. It will of course, be appreciated that the advantages of the two spring conductor design can be obtained in a single actuator design in which duplication of the circuit 20 is made unnecessary.

Figure 6:
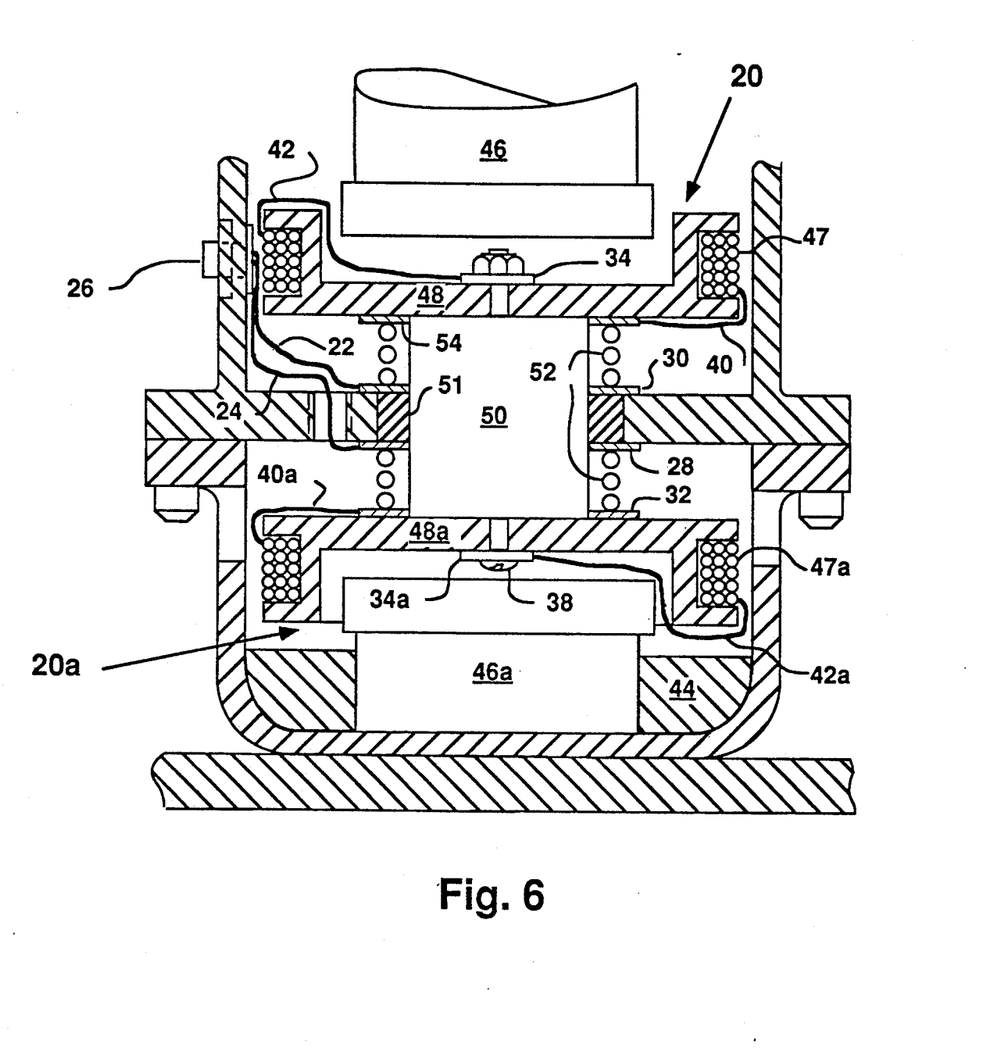
FIG. 6 is a partially sectioned side view of a third embodiment in which the two coils of a second double-coil embodiment are wired in series from a single electrical connector.

FIG. 6 depicts a third embodiment in which opposing voice coils 48 and 48a are wired in series to a single connector 26. As with the two previous embodiments, wires 22, 24, 40, 40a, 42 and 42a are used to interconnect relatively immovable elements while springs 52 connect relatively movable members.

This invention presents a reliable method and apparatus for making electrical connection between a relatively stationary power source and a relatively movable (reciprocating) element, such as the voice coil of an actuator. Various changes, alternatives and modifications will be apparent to one of ordinary skill in the art following a reading of the foregoing specification. It is intended that all such changes, alternatives and modifications as fall within the scope of the appended claims be considered part of the present invention.

What is claimed is:

1. A method for making electrical connection between a member mounted upon a relatively stationary element and a relatively movable element characterized by the steps of
   a) providing first helical centering spring means operative between said relatively stationary element and said relatively movable element, said spring means being axially compressible to store energy as said relatively movable element moves from a first position and to return said relatively movable element to said first position utilizing said stored energy;
   b) connecting an electrical connector which is mounted on said relatively stationary element to an electrical element mounted on said relatively movable element by conducting current spirally through said helical centering spring means from a first end to a second opposite end of said spring means.

2. The method of claim 1 characterized by said providing step includes providing an opposing helical centering spring means on an opposite side of a portion of said relatively stationary element opposing said at least one centering spring.

3. The method of claim 2 wherein said providing step is characterized by providing a first inner and a second outer helical spring as said at least one helical centering spring means and providing a third inner and fourth outer helical centering spring as said opposing helical centering spring means.

4. The method of claim 3 wherein said providing step is further characterized by said first inner spring and second outer spring providing at least a portion of an electrical input path and an electrical return path, respectively, for said electrical element.

5. The method of claim 4 wherein said providing step is further characterized by said third inner spring and said fourth outer spring providing at least a portion of an electrical return path and an electrical input path, respectively, for a second electrical element.

6. Apparatus for supplying electrical current to a movable coil such as in an actuator, comprising
   a) helical centering spring means positioned on a first side of a support structure acting axially to bias said coil to a first position relative to said support structure;
   b) first electrical connector means contacting a first end of said helical centering spring means;
   c) second electrical connector means contacting a second end of said helical centering spring means; whereby said helical spring means is made an element in a primary conductor path for said electrical current flowing to said coil.

7. The apparatus according to claim 6 wherein said first and second electrical connector means comprises first and second metallic washers.

8. The apparatus according to claim 7 further comprising a current input wire affixed to said first metallic washer and a lead wire inputting current to said coil affixed to said second metallic washer, as by soldering.

9. The apparatus according to claim 8 wherein said current return path further comprises a second helical centering spring means.

10. The apparatus according to claim 9 wherein said second centering spring means is positioned on a side of said support structure which is opposite to said first centering spring means.

11. The apparatus according to claim 10 wherein a current return path further comprises a through-bolt used to attach said coil to support structure.

12. The apparatus according to claim 9 further comprising third and fourth electrical connector means positioned at opposite ends of said second centering spring means.

13. The apparatus according to claim 12 wherein said third and fourth electrical connector means comprise third and fourth metallic washers, respectively.

14. The apparatus according to claim 13 wherein said first and second helical spring means are coiled one within the other and are substantially coterminous.

15. The apparatus according to claim 14 further comprising a spring retainer disc for receiving said first and third washers.

16. The apparatus according to claim 15 further comprising outwardly protruding tabs formed upon said first and third washers, said tabs being received in rotation-preventing slots in said spring retainer disc.

17. The apparatus according to claim 16 further comprising an inwardly protruding tab on at least one of said first and third washers, said inwardly protruding tab being received within a slot in a spool about which said washers and spring means slide to prevent relative rotation between said at least one washer and said spool.

18. The apparatus according to claim 17 wherein said spring retainer disc has a first level to receive said first washer and a second level to receive said third washer whereby said first and third washers are electrically isolated.

19. The apparatus of claim 18 further comprising a second spring retainer disc for receiving said second and fourth metallic washers.

20. The apparatus of claim 19 further comprising a second movable coil and duplicate electrical current supply apparatus positioned at an opposite end of said spool on an opposite side of said support structure.

21. A double-acting actuator comprising a spool member extending through an opening in a support structure; a first coil positioned on a first end of said spool; a second coil positioned on a second opposite end of said spool; first and second electrical input means for conducting current to said first and second coils, respectively, each said electrical input means including
   a) an electrical connector mounted upon said support structure for attachment to an electrical current source;

b) a first washer positioned adjacent said support structure;
c) a first current input wire connecting said electrical connector to said washer;
d) a first helical spring having a first end in contact with said first washer;
e) a second washer contacting a second opposite end of said first helical spring;
f) a second current input wire connecting said second washer with said coil;
g) a third washer adjacent said first washer;
h) a spring retainer disc receiving said first and third washers and maintaining them in non-engaging, non-rotating interposition;
i) a second helical spring extending substantially collinearly with said first helical spring, a first end of said second helical spring contacting said third washer;
j) a fourth washer contacting a second opposite end of said second helical spring;
k) a first current return wire interconnecting said coil and said fourth washer;
l) a second spring retainer disc receiving said second and fourth washers and maintaining them in non-engaging, non-rotating interposition;
m) a second current return wire interconnecting said third washer to said electrical connector.

* * * * *